(12) United States Patent
Pellegatti et al.

(10) Patent No.: US 8,080,616 B2
(45) Date of Patent: Dec. 20, 2011

(54) HETEROPHASIC POLYOLEFIN COMPOSITIONS HAVING IMPROVED TENSILE PROPERTIES

(75) Inventors: Giampaolo Pellegatti, Boara (IT); Paolo Goberti, Vigarano Mainarda (IT); Letizia Baraldi, S. Bartolomeo in Bosco (IT); Kazuhiko Minowa, Kawasaki (JP); Yukihiro Hisanaga, Kawasaki (JP)

(73) Assignee: Basell Poliolefine Italia s.r.l., Milan (IT)

( * ) Notice: Subject to any disclaimer, the term of this patent is extended or adjusted under 35 U.S.C. 154(b) by 0 days.

(21) Appl. No.: 12/734,172

(22) PCT Filed: Sep. 29, 2008

(86) PCT No.: PCT/EP2008/062998
§ 371 (c)(1),
(2), (4) Date: Apr. 15, 2010

(87) PCT Pub. No.: WO2009/050025
PCT Pub. Date: Apr. 23, 2009

(65) Prior Publication Data
US 2010/0222518 A1 Sep. 2, 2010

(30) Foreign Application Priority Data
Oct. 17, 2007 (EP) .................................... 07118685

(51) Int. Cl.
*C08F 8/00* (2006.01)
*C08L 9/00* (2006.01)
*C08L 23/04* (2006.01)
*C08L 23/10* (2006.01)

(52) U.S. Cl. .................. 525/191; 525/232; 525/240

(58) Field of Classification Search .................. 525/191, 525/232, 240
See application file for complete search history.

(56) References Cited

U.S. PATENT DOCUMENTS

| 4,399,054 | A | 8/1983 | Ferraris et al. |
| 4,910,262 | A | 3/1990 | Fujii et al. |
| 5,057,475 | A | 10/1991 | Canich et al. |
| 5,145,819 | A | 9/1992 | Winter et al. |
| 5,221,651 | A | 6/1993 | Sacchetti et al. |
| 5,302,454 | A | 4/1994 | Cecchin et al. |
| 5,324,800 | A | 6/1994 | Welborn, Jr. et al. |
| 5,539,067 | A | 7/1996 | Parodi et al. |
| 6,743,864 | B2 * | 6/2004 | Glogovsky et al. ............ 525/191 |
| 2006/0178491 | A1 | 8/2006 | Canich |
| 2009/0156748 | A1 | 6/2009 | Pellegatti et al. |

FOREIGN PATENT DOCUMENTS

| EP | 361493 | 4/1990 |
| EP | 416815 | 3/1991 |
| EP | 643066 | 3/1995 |
| EP | 671404 | 9/1995 |
| EP | 728769 | 8/1996 |
| JP | 58162621 | 9/1983 |
| WO | WO 91/04257 | 4/1991 |

* cited by examiner

*Primary Examiner* — Nathan M Nutter
(74) *Attorney, Agent, or Firm* — Dilworth IP, LLC

(57) ABSTRACT

Polyolefin composition comprising, in percent by weight: A) 50-75% of a blend of polymers (PP) and ($EC^I$), wherein (PP) is selected from the group consisting of: (i) propylene homopolymers; (ii) copolymers of propylene; (iii) combinations of said homopolymers (i) and copolymers (ii); ($EC^1$) is a copolymer of ethylene and propylene or $CH_2$=CHR alpha-olefin(s), where R is a 2-8 carbon alkyl radical, or a copolymer of ethylene, propylene and the said $CH_2$=CHR alpha-olefin(s), containing from 20 to 35%, of ethylene; and B) 25-50% of a copolymer ($EC^{II}$) of ethylene and propylene or $CH_2$=CHR alpha-olefin(s), where R is a 2-8 carbon alkyl radical, or a copolymer of ethylene, propylene and the said $CH_2$=CHR alpha-olefin(s), containing from 40 to 60% of ethylene; in which composition the copolymer component ($EC^I$) is present in amounts from 23 to 45% with respect to the total weight of (A), and the intrinsic viscosity [$\eta^{tot}$] of the fraction XS soluble in xylene at room temperature, referred to the total weight of (A)+(B), is of 3.5 dl/g or more.

11 Claims, No Drawings

HETEROPHASIC POLYOLEFIN COMPOSITIONS HAVING IMPROVED TENSILE PROPERTIES

The present invention concerns flexible elastoplastic polyolefin compositions with improved tensile properties and the process for their preparation.

It is known that one can obtain polyolefin compositions having elastic properties while maintaining a good thermoplastic behavior (i.e., that can be transformed into finished products with the same techniques used for thermoplastic polymers), by way of sequential polymerization of propylene, optionally with minor quantities of olefin comonomers, and then of ethylene/propylene or ethylene/alpha-olefin mixtures.

Catalysts based on halogenated titanium compounds supported on magnesium chloride are generally used for this purpose.

Given the increasing practical interest for this type of compositions, due, among other things, to the valued properties which are typical of polyolefins (such as chemical inertia, mechanical properties and nontoxicity), there is an increasing effort in the art to extend the use of said compositions to many different fields.

European published patent application 400333 describes elastoplastic polyolefin compositions obtained by sequential polymerization comprising:
A) 10-60 parts by weight of a crystalline polymer or copolymer of propylene;
B) 10-40 parts by weight of a polymer fraction containing ethylene, insoluble in xylene at room temperature;
C) 30-60 parts by weight of an ethylene/propylene copolymer fraction, soluble in xylene at room temperature.

Said compositions are flexible and have valued elastic properties, as demonstrated by the low flexural modulus values (less than 700 MPa, and, typically, higher than 200 MPa) associated to good tension set values, but do not have particularly good tensile properties. U.S. Pat. No. 4,910,262 and JP Laid-Open Pub. No. 162621/1983 disclose elastoplastic polyolefin compositions containing two kinds of ethylene copolymers with different ethylene contents. However, the specific combinations of components therein disclosed (with particular reference to the disclosure of the examples) do not allow to obtain a good balance of the said properties.

WO 2007/060060 discloses elastoplastic polyolefin compositions comprising, in percent by weight:
A) 10-50% of a copolymer of propylene with one or more comonomer(s) selected from ethylene and $CH_2=CHR$ alpha-olefins where R is a 2-8 carbon alkyl, which copolymer contains from 1 to 8% of comonomer(s);
B) 50-90% of a blend of copolymers ($b^I$) and ($b^{II}$), both the two copolymers being copolymers of ethylene and (i) propylene or (ii) other $CH_2=CHR$ alpha-olefin(s), where R is a 2-8 carbon alkyl radical, or (iii) a combination thereof, optionally with minor amounts of a diene, wherein copolymer ($b^I$) contains from 18 to 40% of ethylene, and copolymer ($b^{II}$) contains from 55 to 85% of ethylene, and the weight ratio ($b^I$)/($b^{II}$) is from 0.2 to 2;
in which compositions the copolymer component ($b^I$) is present in amounts of 15% or more with respect to the total weight of (A)+(B), the weight ratio $C_2^{II}/C_2^I$ of the content $C_2^{II}$ of ethylene in copolymer component ($b^{II}$) to the content $C_2^I$ of ethylene in copolymer component ($b^I$) is of 1.8 or more, and the intrinsic viscosity [η] of the (weight) fraction XS soluble in xylene at room temperature, referred to the total weight of (A)+(B), is of 2 dl/g or more.

Such compositions typically have Flexural Modulus equal to or lower than 200 MPa, in particular equal to or lower than 150 MPa, and relatively good tensile properties.

However, there is still a need for elastoplastic polyolefin compositions with a flexural modulus values of higher than 150 MPa, preferably higher than 200 MPa but having also high values of tensile strength at break and elongation at break.

In response to such needs the present invention provides a composition comprising, in percent by weight (all percent amounts being by weight):
A) 50-75%, preferably 55-70%, more preferably 60-70% of a blend of polymers (PP) and ($EC^I$), wherein (PP) is selected from the group consisting of:
  (i) propylene homopolymers;
  (ii) copolymers of propylene with one or more comonomer(s) selected from ethylene and $CH_2=CHR$ alpha-olefins where R is a 2-8 carbon alkyl, which copolymers contain from 1 to 8% of comonomer(s);
  (iii) combinations of said homopolymers (i) and copolymers (ii);
  ($EC^I$) is a copolymer of ethylene and propylene or $CH_2=CHR$ alpha-olefin(s), where R is a 2-8 carbon alkyl radical, or a copolymer of ethylene, propylene and the said $CH_2=CHR$ alpha-olefin(s), optionally with minor amounts of a diene, said copolymer ($EC^I$) containing from 20 to 35%, preferably from 20 to 30% of ethylene; and
B) 25-50%, preferably 30-45%, more preferably 30-40% of a copolymer ($EC^{II}$) of ethylene and propylene or $CH_2=CHR$ alpha-olefin(s), where R is a 2-8 carbon alkyl radical, or a copolymer of ethylene, propylene and the said $CH_2=CHR$ alpha-olefin(s), optionally with minor amounts of a diene, said copolymer ($EC^{II}$) containing from 40 to 60%, preferably from 40 to 54%, more preferably from 42 to 54%, in particular from 46 to 54% of ethylene;
in which composition the copolymer component ($EC^I$) is present in amounts from 23 to 45%, preferably from 25 to 45%, more preferably from 25 to 40%, most preferably from 25 to 35% with respect to the total weight of (A), and the intrinsic viscosity [$\eta^{tot}$] of the fraction XS soluble in xylene at room temperature, referred to the total weight of (A)+(B), is of 3.5 Dl/g or more, preferably 3.8 dl/g or more.

The total quantity of copolymerized ethylene is preferably from 15% to 35% by weight, more preferably from 15% to 30% by weight.

The compositions typically present at least one melt peak, determined by way of DSC, at a temperature higher than 120° C., but equal to or lower than 165° C.

Preferably the amount of component (PP) with respect to the total weight of (A)+(B) is 49% by weight or less, more preferably 48% by weight or less. Particularly preferred examples of (PP) are propylene homopolymers.

Other preferred features for the composition of the present invention are:
  Total amount of ($EC^I$) and (B) with respect to the total weight of (A)+(B), of 50% by weight or more;
  Weight ratio $C_2^{II}/C_2^I$ of the content $C_2^{II}$ of ethylene in ($EC^{II}$) to the content $C_2^I$ of ethylene in ($EC^I$) of less than 2.5;
  Ratio [$\eta^I$]/[$\eta^{tot}$] of the intrinsic viscosity [$\eta^I$] of the fraction $XS^A$ soluble in xylene at room temperature of component (A) to the intrinsic viscosity [$\eta^{tot}$], of equal to or higher than 1, more preferably from 1 to 1.5, most preferably from 1 to 1.4;

Weight ratio wEC$^{II}$/w$^A$EC$^I$ of the weight wEC$^{II}$ of EC$^{II}$ with respect to the total weight of (A) and (B) to the weight w$^A$EC$^I$ of EC$^I$ with respect to the weight of (A), of from 0.8 to 1.4;

MFR values, measured according to ASTM-D 1238, condition L (230° C., with 2.16 kg load) of from 0.01 to 10 g/10 min., more preferably from 0.05 to 5 g/10 min.;

Tensile strength at break higher than 10 MPa, in particular equal to or higher than 12 MPa;

Elongation at break of higher than 400%;

Flexural Modulus equal to or higher than 250 MPa;

Amount of fraction soluble in xylene at room temperature (XS) of from 40 to 60% by weight, referred to the total weight of (A)+(B);

Isotacticity index (II) of component (PP) equal to or higher than 90% more preferably equal to or higher than 95%;

A molecular weight distribution in component (A), expressed by the $\overline{Mw}/\overline{Mn}$ ratio, measured by GPC, (Gel Permeation Chromatograpy), equal to or higher than 3.5, more preferably equal to or higher than 4 or 4.5, in particular of 5 or more.

The above cited GPC measurement is preferably carried out in 1,2,4-trichlorobenzene; in detail, the samples are prepared at a concentration of 70 mg/50 ml of stabilized 1,2,4 trichlorobenzene (250 μg/ml BHT (CAS REGISTRY NUMBER 128-37-0)); the samples are then heated to 170° C. for 2.5 hours to solubilize; the measurements are run on a Waters GPCV2000 at 145° C. at a flow rate of 1.0 ml/min. using the same stabilized solvent; three Polymer Lab columns are used in series (Plgel, 20 μm mixed ALS, 300×7.5 mm).

The polymerization process for the preparation of the composition of the present invention may be carried out in a continuous or batch manner, following known techniques, operating in liquid phase, in the presence or not of an inert diluent, or in a gaseous phase, or with mixed liquid-gas techniques.

Polymerization times and temperatures are not critical and are advantageously in the range from 0.5 to 5 hrs, and from 50° C. to 90° C. respectively.

Propylene polymerization to form component (PP) can be done in the presence of ethylene or CH$_2$=CHR alpha-olefin (s) where R is a 2-8 carbon alkyl, such as for example butene-1, pentene-1,4-methylpentene-1, hexene-1 and octene-1, or combinations thereof.

The copolymerization of ethylene and propylene or other alpha-olefin(s), examples of which are given above for component (PP), or combinations thereof, to form components (EC$^I$) and (EC$^{II}$) can occur in the presence of a diene, conjugated or not, such as butadiene, 1,4-hexadiene, 1,5-hexadiene and ethylidene-norbornene-1.

The diene when present, is typically in an amount of from 0.5 to 10% by weight with respect to the weight of the component concerned (namely, (EC$^I$) or (EC$^{II}$)).

In particular the composition can be prepared with a sequential polymerization process carried out in at least three stages, one or more for the synthesis of the component (PP), the others for the synthesis of components (EC$^I$) and (EC$^{II}$), at least one separate stage being used for the preparation of each of (EC$^I$) and (EC$^{II}$). The polymerization in the subsequent stages occurs in the presence of the polymer obtained and the catalyst used in the preceding stage(s).

Regulation of the molecular weight is done by using molecular weight regulators commonly used, e.g. hydrogen and ZnEt$_2$. As already mentioned, the polymerization can occur in liquid phase, gas phase or liquid-gas phase.

For example, it is possible to prepare component (PP) in a (co)polymerization stage using liquid propylene as diluent, and components (EC$^I$) and (EC$^{II}$) in the following copolymerization stages in gas phase, without intermediate stages except for the partial degassing of the propylene.

Preferably, all components (PP), (EC$^I$) and (EC$^{II}$) are prepared by operating the copolymerization in gas phase. The order in which the components are prepared is not critical.

The reaction temperature in the polymerization stage(s) for the preparation of component (PP) and in the ones for the preparation of components (EC$^I$) and (EC$^{II}$) can be the same or different, and is usually from 40° C. to 90° C., preferably 50-80° C. for the preparation of component (PP), and 40-70° C. for the preparation of components (EC$^I$) and (EC$^{II}$).

The pressure of a single stage, if carried out in liquid monomer, is the one which competes with the vapor pressure of the liquid propylene at the operating temperature used, and is modified by the overpressure of the monomer(s) and the hydrogen used as molecular weight regulator, and possibly by the vapor pressure of the small quantity of inert diluent used to feed the catalyst mixture.

The polymerization pressure, if done in liquid phase, indicatively can be from 5 to 30 atm.

The residence times relative to the three or more stages depend on the desired ratio between component (PP), (EC$^I$) and (EC$^{II}$), and are usually from 15 min. to 8 hours.

The said polymerization processes are generally carried out in the presence of stereospecific Ziegler-Natta catalysts supported on magnesium dihalides.

The said stereospecific catalysts used in the polymerization comprise the product of the reaction between:

1) a solid component, containing a titanium compound and an electron-donor compound (internal electron-donor) supported on magnesium dihalide (preferably chloride);
2) an aluminum alkyl compound (cocatalyst); and, optionally,
3) an electron-donor compound (external electron-donor).

Said catalysts are preferably capable of producing homopolymer polypropylene having an isotactic index higher than 90%.

The solid catalyst component (1) contains as electron-donor a compound generally selected among the ethers, ketones, lactones, compounds containing N, P and/or S atoms, and mono- and dicarboxylic acid esters.

Catalysts having the above mentioned characteristics are well known in the patent literature; particularly advantageous are the catalysts described in U.S. Pat. No. 4,399,054 and European patent 45977.

Particularly suited among the said electron-donor compounds are phthalic acid esters and succinic acid esters.

Suitable succinic acid esters are represented by the formula (I):

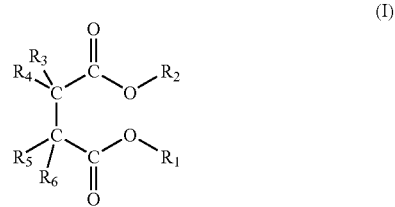

wherein the radicals R$_1$ and R$_2$, equal to or different from each other, are a C1-C20 linear or branched alkyl, alkenyl, cycloalkyl, aryl, arylalkyl or alkylaryl group, optionally containing heteroatoms; the radicals R$_3$ to R$_6$ equal to or different from each other, are hydrogen or a C1-C20 linear or branched alkyl, alkenyl, cycloalkyl, aryl, arylalkyl or alkylaryl group, optionally containing heteroatoms, and the radicals $R_3$ to $R_6$ which are joined to the same carbon atom can be linked together to form a cycle.

$R_1$ and $R_2$ are preferably C1-C8 alkyl, cycloalkyl, aryl, arylalkyl and alkylaryl groups. Particularly preferred are the compounds in which $R_1$ and $R_2$ are selected from primary alkyls and in particular branched primary alkyls. Examples of suitable $R_1$ and $R_2$ groups are methyl, ethyl, n-propyl, n-butyl, isobutyl, neopentyl, 2-ethylhexyl. Particularly preferred are ethyl, isobutyl, and neopentyl.

One of the preferred groups of compounds described by the formula (I) is that in which $R_3$ to $R_5$ are hydrogen and $R_6$ is a branched alkyl, cycloalkyl, aryl, arylalkyl and alkylaryl radical having from 3 to 10 carbon atoms. Another preferred group of compounds within those of formula (I) is that in which at least two radicals from $R_3$ to $R_6$ are different from hydrogen and are selected from C1-C20 linear or branched alkyl, alkenyl, cycloalkyl, aryl, arylalkyl or alkylaryl group, optionally containing heteroatoms. Particularly preferred are the compounds in which the two radicals different from hydrogen are linked to the same carbon atom. Furthermore, also the compounds in which at least two radicals different from hydrogen are linked to different carbon atoms, that is $R_3$ and $R_5$ or $R_4$ and $R_6$ are particularly preferred.

Other electron-donors particularly suited are the 1,3-diethers, as illustrated in published European patent applications EP-A-361 493 and 728769.

As cocatalysts (2), one preferably uses the trialkyl aluminum compounds, such as Al-triethyl, Al-triisobutyl and Al-tri-n-butyl.

The electron-donor compounds (3) that can be used as external electron-donors (added to the Al-alkyl compound) comprise the aromatic acid esters (such as alkylic benzoates), heterocyclic compounds (such as the 2,2,6,6-tetramethylpiperidine and the 2,6-diisopropylpiperidine), and in particular silicon compounds containing at least one Si—OR bond (where R is a hydrocarbon radical). The previously said 1,3-diethers are also suitable to be used as external donors. In the case that the internal donor is one of the said 1,3-diethers, the external donor can be omitted.

The catalysts may be precontacted with small quantities of olefin (prepolymerization), maintaining the catalyst in suspension in a hydrocarbon solvent, and polymerizing at temperatures from room to 60° C., thus producing a quantity of polymer from 0.5 to 3 times the weight of the catalyst.

The operation can also take place in liquid monomer, producing, in this case, a quantity of polymer up to 1000 times the weight of the catalyst.

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the components ($EC^I$) and ($EC^{II}$).

The composition of the present invention can also contain additives, fillers and pigments commonly used for olefin polymers, such as, for example, nucleating agents, extension oils, mineral fillers, organic and inorganic pigments.

The polyolefin composition of the present invention typically finds application in the preparation of molded articles, in particular compression molded or injection molded articles.

The practice and advantages of the present invention are disclosed below in the following examples. These Examples are illustrative only, and are not intended to limit the allowable scope of the invention in any manner whatsoever.

The following analytical methods are used to characterize the polymer compositions.

Melt Flow Rate: ASTM-D 1238, condition L (230° C., with 2.16 kg load).

[η] intrinsic viscosity: determined in tetrahydronaphtalene at 135° C.

Ethylene content: I.R. Spectroscopy.

Shore D: ASTM D 2240, after 10 seconds.

Flexural Modulus: ASTM D 790.

Izod at −40° C.: ASTM D 256.

Tensile Strength at Yield and at Break and Elongation at Yield and at Break

Measured according to ASTM D 638, on type IV specimens. Such specimens are cut in the transverse direction from injection molded plaques having dimensions of 120 mm×120 mm×3.2 mm. Injection molding is carried out at a melt temperature of 230° C. and injection temperature of 215° C.

An Instron machine is used, with test speed of 50 mm/min.

Xylene Soluble and Insoluble Fractions 2.5 g of polymer and 250 cm³ of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 cm³ of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated.

The percent by weight of polymer insoluble in xylene at room temperature is considered the isotacticity index of the polymer. This value corresponds substantially to the isotacticity index determined by extraction with boiling n-heptane, which by definition constitutes the isotacticity index of polypropylene.

Examples 1 and 2 and Comparative Example 1

The solid catalyst component used in polymerization is a highly stereospecific Ziegler-Natta catalyst component supported on magnesium chloride, containing about 2.2% by weight of titanium and diisobutylphthalate as internal donor, prepared by analogy with the method described in Example 3 of European published patent application 395083.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 5 and in such quantity that the TEAL/solid catalyst component weight ratio be equal to 5.

The catalyst system is then subjected to prepolymerization by maintaining it in suspension in liquid propylene at 25° C. for about 30 minutes before introducing it into the first polymerization reactor.

Polymerization

Into a first gas phase polymerization reactor a propylene homopolymer (component (PP)) is produced by feeding in a continuous and constant flow the prepolymerized catalyst system, hydrogen (used as molecular weight regulator) and propylene in the gas state.

The polypropylene copolymer produced in the first reactor is discharged in a continuous flow and, after having been purged of unreacted monomers, is introduced, in a continuous flow, into a second gas phase polymerization reactor, together with quantitatively constant flows of hydrogen, ethylene and propylene in the gas state.

The polymer coming from the second reactor is discharged in a continuous flow and, after having been purged of unreacted monomers, is introduced, in a continuous flow, into a third gas phase polymerization reactor, together with quantitatively constant flows of hydrogen, propylene and ethylene in the gas state.

In the second and third reactors propylene/ethylene copolymers (components ($EC^I$) and ($EC^{II}$)) are thus produced. Polymerization conditions, molar ratio of the reactants and composition of the copolymers obtained are shown in Table 1.

The polymer particles exiting the third reactor are subjected to a steam treatment to remove the reactive monomers and volatile substances, and then dried.

The polymer particles are mixed with and usual stabilisers in a twin screw extruder Berstorff ZE 25 (length/diameter ratio of screws: 33) and extruded under nitrogen atmosphere in the following conditions:

| | |
|---|---|
| Rotation speed: | 250 rpm; |
| Extruder output: | 6-20 kg/hour; |
| Melt temperature: | 200-250° C. |

The polymer composition of Example 2 is obtained by further adding, in the said extrusion stage, 8.8% by weight of a propylene homopolymer having a MFR value of 50 g/10 min. and a isotacticity index value of 98.5%.

Thus the resulting composition contains 43.5% by weight of (PP), 20.7% by weight of $EC^I$, amounting in total to 64.2% by weight of (A), and 35.8% by weight of $EC^{II}$, where $EC^I$ and $EC^{II}$ are the same as in the composition of Example 1, and (PP) is the sum of the (PP) component of Example 1 and of the said additional propylene homopolymer added in the extrusion stage. The $[\eta^{tot}]$ and $[\eta^{tot}]$ and values for the composition of Example 2 are expected to be substantially the same as for the composition of Example 1.

The characteristics relating to the polymer compositions, reported in Table 2, are obtained from measurements carried out on the so extruded polymer. For comparison purposes, Table 2 reports the properties of a polyolefin composition (Comparative Example 1C) prepared by sequential polymerization and comprising (by weight):
A) 44% of a propylene homopolymer having an isotacticity index of 97%;
B) 66% of a propylene-ethylene copolymer containing 50% of ethylene.

TABLE 1

| Example No. | | 1 |
|---|---|---|
| 1$^{st}$ Reactor | | |
| Temperature | ° C. | 70 |
| Pressure | barg | 18 |
| H2/C3- | mol. | 0.09 |
| Split | wt % | 38.5 |
| MFR | g/10' | 50.8 |
| Xylene soluble | wt % | 1.6 |
| 2$^{nd}$ Reactor (component ($EC^I$)) | | |
| Temperature | ° C. | 65 |
| Pressure | barg | 18 |
| H2/C2- | mol. | 0.01 |
| C2-/(C2- + C3-) | mol. | 0.14 |
| Split | wt % | 22.5 |
| C2- content (copolymer) | wt % | 26 |
| X.S.I.V. ($[\eta^I]$) | dl/g | 5.18 |
| 3$^{rd}$ Reactor (component ($EC^{II}$)) | | |
| Temperature | ° C. | 65 |
| Pressure | barg | 18 |
| H2/C2- | mol. | 0.06 |
| C2-/(C2- + C3-) | mol. | 0.316 |
| Split | wt % | 39 |
| C2- content (copolymer) | wt % | 50 |

Notes:
C3- = propylene; C2- = ethylene; split = amount of polymer produced in the concerned reactor; C2- content (copolymer) = ethylene content with respect to the copolymer prepared in the concerned reactor; X.S.I.V = Intrisic Viscosity of the fraction soluble in xylene.

TABLE 2

| Example No. | | 1 | 2 | 1C |
|---|---|---|---|---|
| MFR L | g/10' | 0.4 | 0.5 | 2.7 |
| Xylene soluble | wt % | 53.9 | — | 47 |
| C2- content | wt % | 25.2 | 23.2 | 27 |
| X.S.I.V. ($[\eta^{tot}]$) | dl/g | 4.3 | — | — |
| Shore D | | 36 | 41 | — |
| Flexural Modulus | MPa | 230 | 320 | 420 |
| Izod −40° C. | J/m | N.B. | N.B. | 896 |
| Tensile strength at yield TD | MPa | 7.2 | 8.3 | 7.8 |
| Elongation at yield TD | % | 39.2 | 24 | — |
| Tensile strength at break TD | MPa | 17.2 | 18.7 | 10 |
| Elongation at break TD | % | 815 | 825 | 400 |

Notes:
N.B. = No Breakage; TD = Transverse Direction.

The invention claimed is:

1. Polyolefin composition comprising, in percent by weight:
A) 50-75% of a blend of polymers (PP) and ($EC^I$), wherein (PP) is selected from the group consisting of:
  (i) propylene homopolymers;
  (ii) copolymers of propylene with one or more comonomer(s) selected from ethylene and $CH_2$=CHR alpha-olefins where R is a 2-8 carbon alkyl, which copolymers contain from 1 to 8% of comonomer(s);
  (iii) combinations of said homopolymers (i) and copolymers (ii);
  ($EC^I$) is a copolymer of ethylene and propylene or $CH_2$=CHR alpha-olefin(s), where R is a 2-8 carbon alkyl radical, or a copolymer of ethylene, propylene and the said $CH_2$=CHR alpha-olefin(s), optionally with minor amounts of a diene, said copolymer ($EC^I$) containing from 20 to 35% of ethylene; and
B) 25-50% of a copolymer ($EC^{II}$) of ethylene and propylene, optionally with minor amounts of a diene, said copolymer ($EC^{II}$) containing from 40 to 60% of ethylene;
in which composition the copolymer component ($EC^I$) is present in amounts from 23 to 45% with respect to the total weight of (A), and the intrinsic viscosity $[\eta^{tot}]$ of the fraction XS soluble in xylene at room temperature, referred to the total weight of (A)+(B), is of 3.5 dl/g or more.

2. The polyolefin composition of claim 1, wherein the amount of (PP) with respect to the total weight of (A)+(B) is 49% by weight or less.

3. The polyolefin composition of claim 1, wherein the total amount of ($EC^I$) and (B) with respect to the total weight of (A)+(B), is of 50% by weight or more.

4. A polyolefin composition comprising, in percent by weight:
A) 50-75% of a blend of polymers (PP) and ($EC^I$), wherein (PP) is a propylene homopolymer and ($EC^I$) is a copolymer of ethylene and propylene or $CH_2$=CHR alpha-olefin(s), where R is a 2-8 carbon alkyl radical, or a copolymer of ethylene, propylene and the said $CH_2$=CHR alpha-olefin(s), optionally with minor amounts of a diene, said copolymer ($EC^I$) containing from 20 to 35% of ethylene; and
B) 25-50% of a copolymer ($EC^{II}$) of ethylene and propylene, optionally with minor amounts of a diene, said copolymer ($EC^{II}$) containing from 40 to 60% of ethylene;
in which composition the copolymer component ($EC^I$) is present in amounts from 23 to 45% with respect to the total weight of (A), and the intrinsic viscosity [$\eta^{tot}$] of the fraction XS soluble in xylene at room temperature, referred to the total weight of (A)+(B), is of 3.5 dl/g or more.

5. The polyolefin composition of claim 1, wherein the weight ratio $C_2^{II}/C_2^{I}$ of the content $C_2^{II}$ of ethylene in ($EC^{II}$) to the content $C_2^{I}$ of ethylene in ($EC^{I}$) is of less than 2.5.

6. The polyolefin composition of claim 1, having a ratio [$\eta^I$]/[$\eta^{tot}$] of the intrinsic viscosity [$\eta^I$] of the fraction $XS^A$ soluble in xylene at room temperature of component (A) to the intrinsic viscosity [$\eta^{tot}$], of higher than 1.

7. The polyolefin composition of claim 1, having a weight ratio $wEC^{II}/w^A EC^I$ of the weight $wEC^{II}$ of $EC^{II}$ with respect to the total weight of (A) and (B) to the weight $w^A EC^I$ of $EC^I$ with respect to the weight of (A), of from 0.8 to 1.4.

8. The polyolefin composition of claim 1, having Flexural Modulus values equal to or higher than 250 MPa.

9. A polymerization process for preparing a polyolefin composition comprising, in percent by weight:
A) 50-75% of a blend of polymers (PP) and ($EC^I$), wherein (PP) is selected from the group consisting of:
(i) propylene homopolymers;
(ii) copolymers of propylene with one or more comonomer(s) selected from ethylene and $CH_2$=CHR alpha-olefins where R is a 2-8 carbon alkyl, which copolymers contain from 1 to 8% of comonomer(s);
(iii) combinations of said homopolymers (i) and copolymers (ii);
($EC^I$) is a copolymer of ethylene and propylene or $CH_2$=CHR alpha-olefin(s), where R is a 2-8 carbon alkyl radical, or a copolymer of ethylene, propylene and the said $CH_2$=CHR alpha-olefin(s), optionally with minor amounts of a diene, said copolymer ($EC^I$) containing from 20 to 35% of ethylene; and
B) 25-50% of a copolymer ($EC^{II}$) of ethylene and propylene, optionally with minor amounts of a diene, said copolymer ($EC^{II}$) containing from 40 to 60% of ethylene;
in which composition the copolymer component ($EC^I$) is present in amounts from 23 to 45% with respect to the total weight of (A), and the intrinsic viscosity [$\eta^{tot}$] of the fraction XS soluble in xylene at room temperature, referred to the total weight of (A)+(B), is of 3.5 dl/g or more,
the process comprising polymerizing in at least three sequential stages, wherein components (PP), ($EC^I$) and ($EC^{II}$) are prepared in separate subsequent stages, operating in each stage, except the first stage, in the presence of the polymer formed and the catalyst used in the preceding stage.

10. Manufactured articles comprising a polyolefin composition, the polyolefin composition comprising, in percent by weight:
A) 50-75% of a blend of polymers (PP) and ($EC^I$), wherein (PP) is selected from the group consisting of:
(i) propylene homopolymers;
(ii) copolymers of propylene with one or more comonomer(s) selected from ethylene and $CH_2$=CHR alpha-olefins where R is a 2-8 carbon alkyl, which copolymers contain from 1 to 8% of comonomer(s);
(iii) combinations of said homopolymers (i) and copolymers (ii);
($EC^I$) is a copolymer of ethylene and propylene or $CH_2$=CHR alpha-olefin(s), where R is a 2-8 carbon alkyl radical, or a copolymer of ethylene, propylene and the said $CH_2$=CHR alpha-olefin(s), optionally with minor amounts of a diene, said copolymer ($EC^I$) containing from 20 to 35% of ethylene; and
B) 25-50% of a copolymer ($EC^{II}$) of ethylene and propylene, optionally with minor amounts of a diene, said copolymer ($EC^{II}$) containing from 40 to 60% of ethylene;
in which composition the copolymer component ($EC^I$) is present in amounts from 23 to 45% with respect to the total weight of (A), and the intrinsic viscosity [$\eta^{tot}$] of the fraction XS soluble in xylene at room temperature, referred to the total weight of (A)+(B), is of 3.5 dl/g or more.

11. The manufactured articles of claim 10, in the form of compression molded or injection molded articles.

* * * * *